US007194893B2

(12) United States Patent
Cook et al.

(10) Patent No.: US 7,194,893 B2
(45) Date of Patent: Mar. 27, 2007

(54) TEMPERATURE CORRECTION METHOD AND SUBSYSTEM FOR AUTOMOTIVE EVAPORATIVE LEAK DETECTION SYSTEMS

(75) Inventors: John E. Cook, Chatham (CA); Paul D. Perry, Chatham (CA)

(73) Assignee: Siemens Canada Limited, Mississauga ( * ) Notice: Subject to any disclaimer, the term of this patent is extended or adjusted under 35 U.S.C. 154(b) by 0 days.

(21) Appl. No.: 09/165,772

(22) Filed: Oct. 2, 1998

(65) Prior Publication Data

US 2002/0011094 A1 Jan. 31, 2002

Related U.S. Application Data

(60) Provisional application No. 60/060,858, filed on Oct. 2, 1997.

(51) Int. Cl.
*G01M 3/34* (2006.01)

(52) U.S. Cl. .................................... 73/40.5 R; 702/51

(58) Field of Classification Search .................... 73/40, 73/40.5 R, 49.2, 45.4, 49.1, 49.3, 40.5; 702/51
See application file for complete search history.

(56) References Cited

U.S. PATENT DOCUMENTS

| | | | | |
|---|---|---|---|---|
| 3,413,840 | A * | 12/1968 | Basile et al. | 73/49.2 |
| 4,766,557 | A * | 8/1988 | Twerdochlib | 702/51 |
| 4,852,054 | A | 7/1989 | Mastandrea | 364/509 |
| 4,901,559 | A | 2/1990 | Grabner | 73/64.2 |
| 4,905,505 | A | 3/1990 | Reed | 73/64 |
| 5,259,424 | A * | 11/1993 | Miller et al. | 73/149 X |
| 5,263,462 | A | 11/1993 | Reddy | 123/520 |
| 5,372,032 | A * | 12/1994 | Filippi et al. | 73/40.5 R |
| 5,375,455 | A | 12/1994 | Maresca, Jr. et al. | 73/40.5 |
| 5,415,033 | A * | 5/1995 | Maresca, Jr. et al. | 73/40.5 R |
| 5,425,344 | A * | 6/1995 | Otsuka et al. | 123/520 |
| 5,448,980 | A | 9/1995 | Kawamura et al. | 123/520 |
| 5,564,306 | A * | 10/1996 | Miller | 73/861 |
| 5,614,665 | A | 3/1997 | Curran et al. | 73/118.1 |
| 6,073,487 | A | 6/2000 | Dawson | 73/118.1 |
| 6,089,081 | A * | 7/2000 | Cook et al. | 73/118.1 |
| 6,343,505 | B1 * | 2/2002 | Cook et al. | 73/118.1 |
| 6,672,138 | B2 * | 1/2004 | Cook et al. | 73/40.5 R |

FOREIGN PATENT DOCUMENTS

| | | |
|---|---|---|
| WO | 99/50551 | 10/1999 |

OTHER PUBLICATIONS

"Correcting Pressure Change Leak Test Data for Changes in Temperature", Nondestructive Testing Handbook, vol. 1, Leak Testing, Robert C. Mc.Master (Editor), 1984, pp. 218-222.*

* cited by examiner

*Primary Examiner*—Hezron Williams
*Assistant Examiner*—Rose M. Miller

(57) ABSTRACT

A method and sensor or sensor subsystem permit improved evaporative leak detection in an automotive fuel system. The sensor or sensor subsystem computes temperature-compensated pressure values, thereby eliminating or reducing false positive or other adverse results triggered by temperature changes in the fuel tank. The temperature-compensated pressure measurement is then available for drawing an inference regarding the existence of a leak with reduced or eliminated false detection arising as a result of temperature fluctuations.

8 Claims, 2 Drawing Sheets

TEMPERATURE CORRECTION METHOD AND SUBSYSTEM FOR AUTOMOTIVE EVAPORATIVE LEAK DETECTION SYSTEMS

This application claims the benefit of the Oct. 2, 1997 filing date of provisional application No. 60/060,858.

FIELD OF THE INVENTION

The present invention relates, in general, to automotive fuel leak detection methods and systems and, in particular, to a temperature correction approach to automotive evaporative fuel leak detection.

BACKGROUND OF THE INVENTION

Automotive leak detection systems can use either positive or negative pressure differentials, relative to atmosphere, to check for a leak. Pressure change over a given period of time is monitored and correction is made for pressure changes resulting from gasoline fuel vapor.

It has been established that the ability of a leak detection system to successfully indicate a small leak in a large volume is directly dependent on the stability or conditioning of the tank and its contents. Reliable leak detection can be achieved only when the system is stable. The following conditions are required:

a) Uniform pressure throughout the system being leak-checked;

b) No fuel movement in the gas tank (which may results in pressure fluctuations); and c) No change in volume resulting from flexure of the gas tank or other factors.

Conditions a), b), and c) can be stabilized by holding the system being leak-checked at a fixed pressure level for a sufficient period of time and measuring the decay in pressure from this level in order to detect a leak and establish its size.

SUMMARY OF THE INVENTION

The method and sensor or subsystem according to the present invention provide a solution to the problems outlined above. In particular, an embodiment of one aspect of the present invention provides a method for making temperature-compensated pressure readings in an automotive evaporative leak detection system having a tank with a vapor pressure having a value that is known at a first point in time. According to this method, a first temperature of the vapor is measured at substantially the first point in time and is again measured at a second point in time. Then a temperature-compensated pressure is computed based on the pressure at the first point in time and the two temperature measurements.

According to another aspect of the present invention, the resulting temperature-compensated pressure can be compared with a pressure measured at the second point in time to provide a basis for inferring the existence of a leak.

An embodiment of another aspect of the present invention is a sensor subsystem for use in an automotive evaporative leak detection system in order to compensate for the effects on pressure measurement of changes in the temperature of the fuel tank vapor. The sensor subsystem includes a pressure sensor in fluid communication with the fuel tank vapor, a temperature sensor in thermal contact with the fuel tank vapor, a processor in electrical communication with the pressure sensor and with the temperature sensor and logic implemented by the processor for computing a temperature-compensated pressure based on pressure and temperature measurements made by the pressure and temperature sensors.

DETAILED DESCRIPTION

Figure 1:
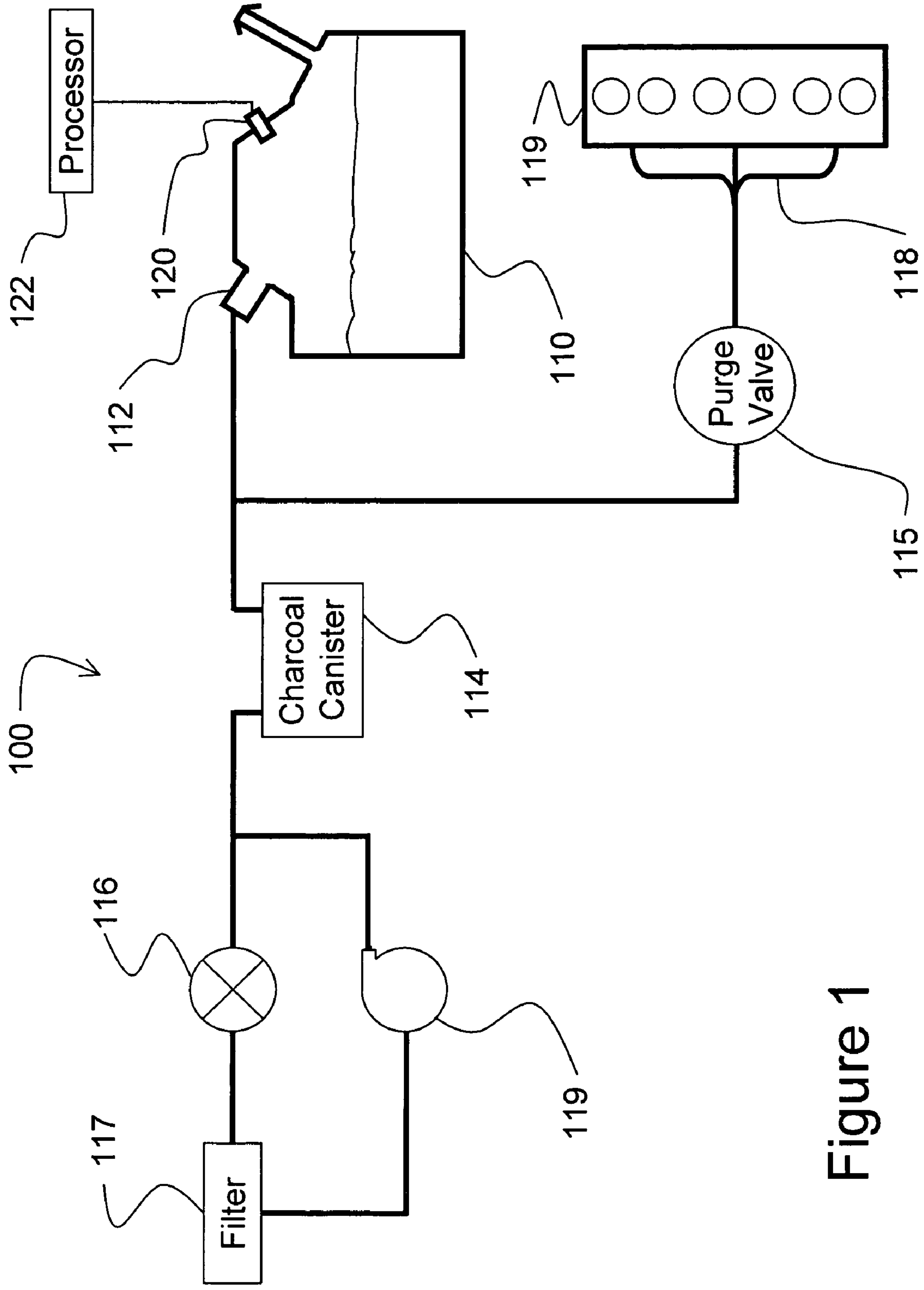
FIG. 1 shows, in schematic form, an automotive evaporative leak detection system in the context of an automotive fuel system, the automotive leak detection system including an embodiment of a temperature correction sensor or subsystem according to the present invention.

We have discovered that, in addition to items a), b), and c) set forth in the Background section above, another condition that affects the stability of fuel tank contents and the accuracy of a leak detection system is thermal upset of the vapor in the tank. If the temperature of the vapor in the gas tank above the fuel is stabilized (i.e., does not undergo a change), a more reliable leak detection test can be conducted.

Changes in gas tank vapor temperature prove less easy to stabilize than pressure. A vehicle can, for example, be refueled with warmer than ambient fuel. A vacuum leak test performed after refueling under this condition would falsely indicate the existence of a leak. The cool air in the gas tank would be heated by incoming fuel and cause the vacuum level to decay, making it appear as though there were a diminution of mass in the tank. A leak is likely to be falsely detected any time heat is added to the fuel tank. If system pressure were elevated in order to check for a leak under a positive pressure leak test, and a pressure decay were then measured as an indicia of leakage, the measured leakage would be reduced because the vapor pressure would be higher than it otherwise would. Moreover, measured pressure would also decline as the vapor eventually cools back down to ambient pressure. A long stabilization period would be necessary to reach the stable conditions required for an accurate leak detection test.

The need for a long stabilization period as a precondition to an accurate leak detection test result would be commercially disadvantageous. A disadvantageously long stabilization period can be compensated for and eliminated, according to the present invention, by conducting the leak detection test with appropriate temperature compensation even before the temperature of the vapor in the gas tank has stabilized. More particularly, a detection approach according to the present invention uses a sensor or sensor subsystem that is able to either:

1) Provide information on the rate of change of temperature as well as tank vapor pressure level, and correct or compensate for the change in temperature relative to an earlier-measured temperature reference; or 2) Provide tank pressure level information corrected (e.g., within the sensor to a constant temperature reference), the result being available for comparison with other measured pressure to conduct a leak-detection test.

In order to obtain the data required for option 1), two separate values must be determined (tank temperature rate of change and tank pressure) to carry out the leak detection test.

These values can be obtained by two separate sensors in the tank, or a single sensor configured to provide both values.

Alternatively, if tank pressure is to be corrected in accordance with option 2), then a single value is required. This single value can be obtained by a new "Cp" sensor (compensated or corrected pressure sensor or sensor subsystem) configured to provide a corrected pressure.

To obtain this corrected pressure, $P_c$, the reasonable assumption is made that the vapor in the tank obeys the ideal gas law, or:

$$PV=nRT$$

where:

P=pressure;

V=volume;

n=mass;

R=gas constant; and

T=temperature.

This expression demonstrates that the pressure of the vapor trapped in the tank will increase as the vapor warms, and decrease as it cools. This decay can be misinterpreted as leakage. The Cp sensor or sensor subsystem, according to the present invention, cancels the effect of a temperature change in the constant volume gas tank. To effectuate such cancellation, the pressure and temperature are measured at two points in time. Assuming zero or very small changes in n, given that the system is sealed, the ideal gas law can be expressed as:

$$P_1V_1/RT_1=P_2V_2/RT_2$$

Since volume, V, and gas constant, R, are reasonably assumed to be constant, this expression can be rewritten as:

$$P_2=P_1(T_2/T_1).$$

This relation implies that pressure will increase from $P_1$ to $P_2$ if the temperature increases from $T_1$ to $T_2$ in the sealed system.

To express this temperature-compensated or -corrected pressure, the final output, $P_c$, of the Cp sensor or sensor subsystem will be:

$$P_c=P_1-(P_2-P_1)$$

where $P_c$ is the corrected pressure output. Substituting for $P_2$, we obtain:

$$P_c=P_1-(P_1(T_2/T_1)-P_1).$$

More simply, $P_c$ can be rewritten as follows:

$$P_c=P_1(2-T_2/T_1).$$

As an example using a positive pressure test using the Cp sensor or sensor subsystem to generate a temperature-compensated or -corrected pressure output, the measured pressure decay determined by a comparison between $P_c$ and $P_2$ (the pressure measured at the second point in time) will be a function only of system leakage. If the temperature-compensated or -corrected pressure, $P_c$, is greater than the actual, nominal pressure measured at the second point in time (i.e., when $T_2$ was measured), then there must have been detectable leakage from the system. If Pc is not greater than the nominal pressure measured at $T_2$, no leak is detected. The leak detection system employing a sensor or subsystem according to the present invention will reach an accurate result more quickly than a conventional system, since time will not be wasted waiting for the system to stabilize. The Cp sensor or subsystem allows for leakage measurement to take place in what was previously considered an unstable system.

FIG. 1 shows an automotive evaporative leak detection system (vacuum) using a tank pressure sensor 120 that is able to provide the values required for leak detection in accordance with options 1) and 2) above. The tank pressure/temperature sensor 120 should be directly mounted onto the gas tank 110, or integrated into the rollover valve 112 mounted on the tank 110.

Gas tank 110, as depicted in FIG. 1, is coupled in fluid communication to charcoal canister 114 and to the normally closed canister purge valve 115. The charcoal canister 114 is in communication via the normally open canister vent solenoid valve 116 to filter 117. The normally closed canister purge valve 115 is coupled to manifold (intake) 118 of internal combustion engine 119. The illustrated embodiment of the sensor or subsystem 120 according to the present invention incorporates a pressure sensor, temperature sensor and processor, memory and clock, such components all being selectable from suitable, commercially available products. The pressure and temperature sensors are coupled to the processor such that the processor can read their output values. The processor can either include the necessary memory or clock or be coupled to suitable circuits that implement those functions. The output of the sensor, in the form of a temperature-compensated pressure value, as well as the nominal pressure (i.e., $P_2$), are transmitted to processor 122, where a check is made to determine whether a leak has occurred. That comparison, alternatively, could be made by the processor in sensor 120.

In an alternative embodiment of the present invention, the sensor or subsystem 120 includes pressure and temperature sensing devices electronically coupled to a separate processor 122 to which is also coupled (or which itself includes) memory and a clock. Both this and the previously described embodiments are functionally equivalent in terms of providing a temperature-compensated pressure reading and a nominal pressure reading, which can be compared, and which comparison can support an inference as to whether or not a leak condition exists.

Figure 2:
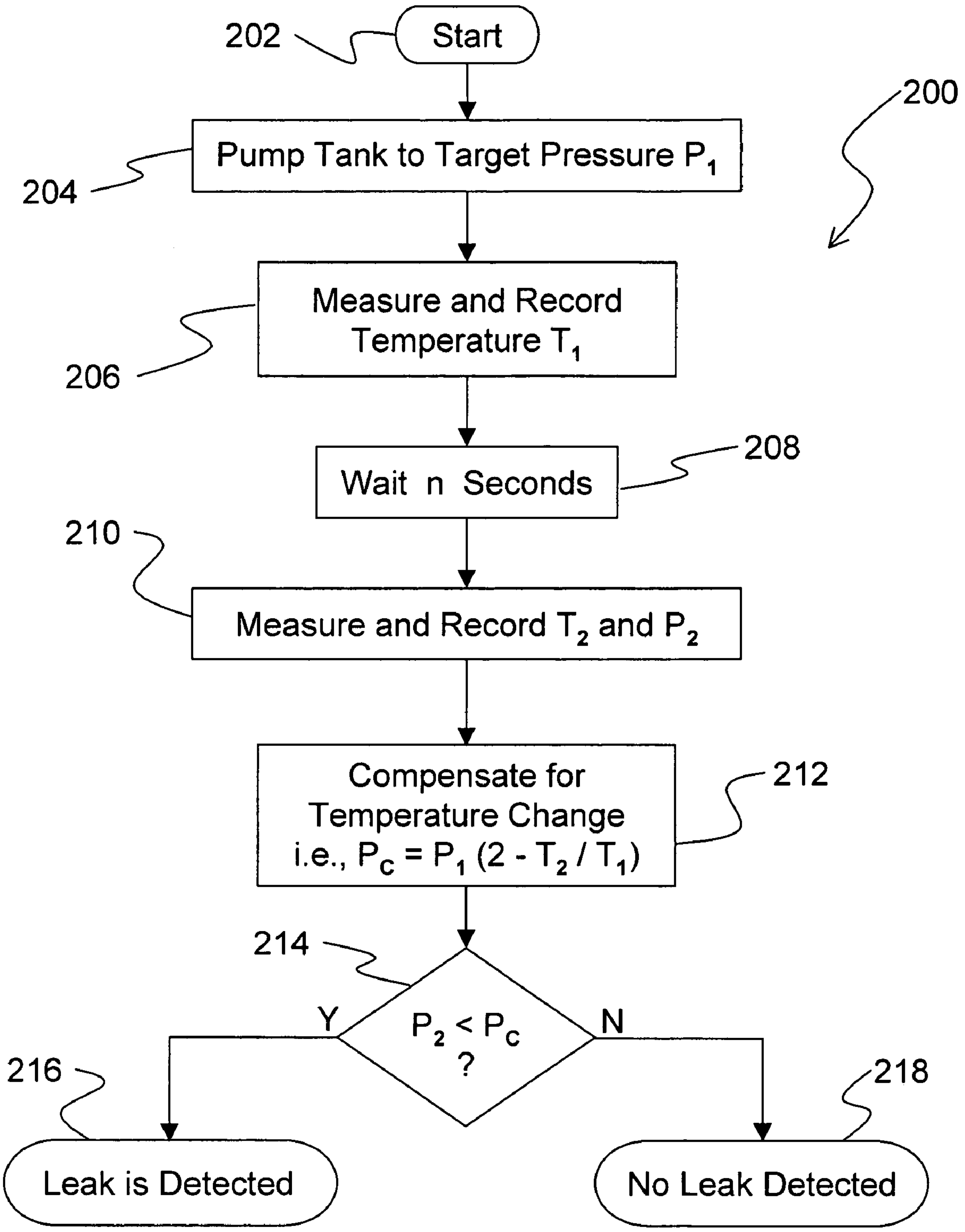
FIG. 2 shows, in flowchart form, an embodiment of a method for temperature correction, according to the present invention, in an automotive evaporative leak detection system.

FIG. 2 provides a flowchart 200 setting forth steps in an embodiment of the method according to the present invention. These steps can be implemented by any processor suitable for use in automotive evaporative leak detection systems, provided that the processor: (1) have or have access to a timer or clock; (2) be configured to receive and process signals emanating, either directly or indirectly from a fuel vapor pressure sensor; (3) be configured to receive and process signals emanating either directly or indirectly from a fuel vapor temperature sensor; (4) be configured to send signals to activate a pump for increasing the pressure of the fuel vapor; (5) have, or have access to memory for retrievably storing logic for implementing the steps of the method according to the present invention; and (6) have, or have access to, memory for retrievably storing all data associated with carrying out the steps of the method according to the present invention.

After initiation, at step 202 (during which any required initialization may occur), the processor directs pump 119 at step 204, to run until the pressure sensed by the pressure sensor equals a preselected target pressure $P_1$. (Alternatively, to conduct a vacuum leak detection test, the processor would direct the system to evacuate to a negative pressure via actuation of normally closed canister purge valve 115). The processor therefore should sample the pressure reading with sufficient frequency such that it can turn off the pump 119 (or close valve 115) before the target pressure $P_1$ has been significantly exceeded.

At step 206, which should occur very close in time to step 204, the processor samples, and in the memory records, the fuel vapor temperature signal, $T_1$, generated by the temperature sensor. The processor, at step 208, then waits a preselected period of time (e.g., between 10 and 30 seconds). When the desired amount of time has elapsed, the processor, at step 210, samples and records in memory the fuel vapor temperature signal, $T_2$, as well as fuel vapor pressure, $P_2$.

The processor, at step 212, then computes an estimated temperature-compensated or corrected pressure, $P_c$, compensating for the contribution to the pressure change from $P_1$ to $P_2$ attributable to any temperature change ($T_2-T_1$).

In an embodiment of the present invention, the temperature-compensated or corrected pressure, $P_c$, is computed according to the relation:

$$P_c=P_1(2-T_2/T_1)$$

and the result is stored in memory. Finally, at step 214, the temperature-compensated pressure, $P_c$, is compared by the processor with the nominal pressure $P_2$. If $P_2$ is less than $P_c$, then fuel must have escaped from the tank, indicating a leak, 216. If, on the other hand, $P_2$ is not less than $P_c$, then there is no basis for concluding that a leak has been detected, 218.

The foregoing description has set forth how the objects of the present invention can be fully and effectively accomplished. The embodiments shown and described for purposes of illustrating the structural and functional principles of the present invention, as well as illustrating the methods of employing the preferred embodiments, are subject to change without departing from such principles. Therefore, this invention includes all modifications encompassed within the spirit of the following claims.

What is claimed is:

1. A method for evaporative leak detection of an automotive vehicle fuel system including a tank having vapor at a known pressure at a first point in time, the method comprising:

supplying from the tank fuel being combusted by the automotive vehicle;

measuring and recording a first temperature of the vapor at substantially the first point in time, which is not during the supplying;

measuring and recording a second temperature and a measured pressure of the vapor at a second point in time, which is not during the supplying;

computing a temperature-compensated pressure based on previously measured values; and comparing the temperature-compensated pressure with the measured pressure at a second point in time to detect a leak, wherein the temperature-compensated pressure is computed as a function of the known pressure at the first point in time and of the measured temperatures, wherein the function comprises:

$$P_c=P_1(2-T_2/T_1)$$

where $P_c$ is the temperature-compensated pressure, $T_1$ is the first temperature at the first point in time and $T_2$ is the second temperature at the second point in time.

2. A method for evaporative leak detection in a fuel system of an automotive vehicle, the method comprising:

supplying with the fuel system fuel being combusted by the automotive vehicle;

measuring and recording a first temperature and a first vapor pressure in the fuel system at a first point in time, which is not during the supplying;

measuring and recording a second temperature and a second vapor pressure in the fuel system at a second point in time, which is not during the supplying;

compensating the first vapor pressure based on the first and second temperatures, thereby defining a temperature-compensated first vapor pressure; and comparing the temperature-compensated first vapor pressure with the second vapor pressure to detect a leak in the fuel system between the first and second points in time, wherein the temperature-compensated first vapor pressure is computed as a function of the known pressure at the first point in time and of the measured temperatures, wherein the function comprises:

$$P_c=P_1(2-T_2/T_1)$$

where $P_c$ is the temperature-compensated pressure, $T_1$ is the first temperature at the first point in time and $T_2$ is the second temperature at the second point in time.

3. A method of evaporative leak detection for a fuel system of a vehicle including an internal combustion engine and a fuel tank, the fuel system having fuel vapor at a known pressure at a first point in time, the method comprising:

combusting in the internal combustion engine fuel from the fuel tank;

measuring at substantially the first point in time a first temperature of the fuel vapor, the first point in time is not during the combusting, measuring at a second point in time a second temperature of the fuel vapor and a measured pressure of the fuel vapor, the second point in time is not during the combusting;

computing a temperature-compensated pressure based on:

the known pressure of the fuel vapor at the first point in time the first temperature of the fuel vapor, and the second temperature of the fuel vapor; and comparing the temperature-compensated pressure with the measured pressure at the second point in time to detect a leak, wherein the computing the temperature-compensated pressure comprises:

$$P_c=P_1(2-T_2/T_1)$$

where $P_c$ is the temperature-compensated pressure, $T_1$ is the first temperature at the first point in time and $T_2$ is the second temperature at the second point in time.

4. The method according to claim 3, further comprising:

recording at substantially the first point in time a first temperature of the fuel vapor; and recording at a second point in time a second temperature of the fuel vapor and a measured pressure of the fuel vapor.

5. The method according to claim 3, wherein the second point in time follows the first point in time.

6. The method according to claim 5, wherein the combusting occurs separately from the measuring.

7. A method for evaporative leak detection for a fuel system of including an engine and a fuel tank, the method comprising:

supplying fuel from the fuel tank to the engine;

measuring and recording a first temperature and a first vapor pressure in the fuel system at a first point in time, which is not during the supplying fuel;

measuring and recording a second temperature and a second vapor pressure in the fuel system at a second point in time, which is not during the supplying fuel;

compensating the first vapor pressure based on the first and second temperatures, thereby defining a temperature-compensated first vapor pressure; and comparing the temperature-compensated first vapor pressure with the second vapor pressure to detect a leak in the fuel system between the first and second points in time, wherein the temperature-compensated first vapor pressure is computed as a function of the known pressure at the first point in time and of the measured temperatures, wherein the function comprises:

$$P_c = P_1(2 - T_2/T_1)$$

where $P_c$ is the temperature-compensated first vapor pressure, $T_1$ is the first temperature at the first point in time and $T_2$ is the second temperature at the second point in time.

8. The method according to claim 7, further comprising:

recording the first temperature and the first vapor pressure in the fuel system at the first point in time; and recording the second temperature and the second vapor pressure in the fuel system at the second point in time.

* * * * *